United States Patent [19]
Bouldin

[11] Patent Number: 5,597,125
[45] Date of Patent: Jan. 28, 1997

[54] APPARATUS FOR FLUFFING BALES OF PEAT MOSS AND OTHER ORGANIC MATTER

[75] Inventor: Floyd E. Bouldin, Murfreesboro, Tenn.

[73] Assignee: Bouldin & Lawson, Inc., McMinnville, Tenn.

[21] Appl. No.: 353,713

[22] Filed: Dec. 12, 1994

[51] Int. Cl.⁶ .................. B02C 13/286; B02C 18/06
[52] U.S. Cl. .............. 241/136; 241/138; 241/186.2; 241/224; 241/235; 241/280
[58] Field of Search ................. 241/136, 138, 241/186.2, 224, 235, 277, 280, 281

[56] References Cited

U.S. PATENT DOCUMENTS

| | | | |
|---|---|---|---|
| 3,915,392 | 10/1975 | Kugler | 241/604 X |
| 3,979,074 | 9/1976 | White et al. | 241/605 X |
| 3,999,674 | 12/1976 | Meitl | 241/605 X |
| 4,082,198 | 4/1978 | Anderson et al. | 241/605 X |
| 4,101,081 | 7/1978 | Ritter et al. | 241/101.74 |
| 4,151,961 | 5/1979 | Makofka et al. | 241/605 |

FOREIGN PATENT DOCUMENTS

| | | | |
|---|---|---|---|
| 224930 | 10/1959 | Australia | 241/605 |
| 2522472 | 9/1983 | France | 241/605 |

*Primary Examiner*—Tomothy V. Eley
*Attorney, Agent, or Firm*—Rich R. Wascher

[57] ABSTRACT

The present invention is directed to an apparatus for disassociating material such as peat moss from a compressed bale. The apparatus includes a housing having a plurality of substantially vertically stacked agitator assemblies. The agitator assemblies are rotatable in response to an independent hydraulic drive motor attached to one end of the vertical shaft of each agitator spindle partially comprising the agitator assembly. The hydraulic motors are mounted to the exterior of the housing, but receive the aforementioned shafts. A lifting platform is provided within the housing to enable a bale of material to be placed thereon. The lifting platform is hydraulically manipulated such that it may be raised to enable the bale of material to come in contact with the rotating spindles of the agitator assemblies. An exit port is provided in the lowermost portion of the housing to enable the material to be ejected from the housing after it is disassociated from the bale. The operation of the spindle assemblies disassociates material from the bale, but does not shred the material so as to maintain its original particle or strand form.

14 Claims, 4 Drawing Sheets

APPARATUS FOR FLUFFING BALES OF PEAT MOSS AND OTHER ORGANIC MATTER

BACKGROUND OF THE INVENTION

1. Field of the Invention

The present invention relates generally to apparatuses and devices for disassociating organic material, such as peat moss, from a compressed bale thereof, but more particularly to such apparatuses and devices incorporating agitators or beater bars to disassociate the peat moss or other organic material from the compressed bale.

2. Description of the Related Art

The art to which the invention relates includes apparatuses for breaking and crumbling organic material from a compressed bale form of such material. Such devices have been known to be useful for breaking up bales of peat moss used in the planting and nursery industry.

One common disadvantage associated with inventions comprising the art to which the invention relates is the shredding action associated with such devices. That is, the devices comprising the art to which the invention relates typically shred the peat moss fragments and thus reduce the strand size of the peat moss. Thus, the devices comprising the art to which the invention relates not only disassociate the peat moss from a compressed bale, but also have the tendency to shred and reduce the size of the individual pete strands or particles.

The moisture retaining capabilities of the peat moss is believed to be reduced when the particle or strand size of the peat is reduced. Thus, the shredding or tearing of the individual peat strands is believed to reduce the effectiveness of the peat.

Another common drawback associated with devices and apparatuses comprising the art to which the invention relates is the dissatisfaction amongst the nursery and planting industry personnel with the resultant product, and the inability of available devices to break up large four foot by eight foot bales of peat moss. Shredded peat moss is undesirable to growers and planters in the growing and planting industry, because it losses its fluffiness. That is, nursery and planting industry personnel desire peat moss in a substantially non-shredded form such that long strands of peat moss are preferred rather than the fragmented shredded and reduced size of the peat moss fragments. Accordingly, it is believed that peat moss in its original cut form prior to baling is the desired form used in the nursery and planting industry, and hence a shredded smaller particle or strand size is less desirable for use.

Prior to the production of the present invention, a device incorporating agitators which forcibly remove the peat particles and particles of other organic material from a compressed bale without a significant reduction in original particle or strand size and incorporating the mechanical features described herein, has not been invented.

SUMMARY OF THE INVENTION

The present invention is directed to an apparatus for disassociating particles of organic matter such as peat moss from a compressed bale. By way of example, a peat moss bale shall be used throughout with the understanding that the scope of the present invention is not limited to bales of peat moss, but may also be utilized with bales of other organic matter.

The present invention includes a substantially rectangular vertical housing incorporating a plurality of agitators. Each agitator is ideally independently hydraulically driven by its own hydraulic motor or power source. In this fashion, after long and extended use, if a hydraulic motor fails, it can simply be replaced with ease. In addition, if a hydraulic motor associated with one or more of the agitators were to fail, the apparatus could still be utilized with diminished effectiveness, but the failed hydraulic motor would not disable the overall apparatus from functioning.

The agitators are preferably aligned in a vertical stacked arrangement in close proximity to one another. Each agitator has a substantially horizontal shaft with spaced apart ends. One of the spaced apart ends is rotatably mounted to a side of the housing by way of a bushing or bearing assembly. The other spaced apart end is connected to and associated with a hydraulic drive motor having a single source of hydraulic fluid power and the associated connections attached thereto. It is believed to be important, although not essential, that each agitator spindle having its spaced apart end be mounted substantially perpendicular to the sidewalls of the housing. This orientation insures extended wear and life due to its balanced and centered orientation. Each agitator spindle further includes a plurality of agitator bars which are spaced apart along the horizontal shaft in a staggered relationship. The staggered relationship resembles a spiral when viewed from either end of a particular spindle.

With respect to any agitator spindle, it is preferred that the agitator bars be mounted in a staggered relationship as described, but more particularly at 90 degrees, 180 degrees, 270 degrees and 360 degrees when viewed from an end of the spindle along its longitudinal shaft axis. It is also preferred that each agitator bar form an angle with respect to its connection to the substantially horizontal shaft on which it is attached. Similarly, each agitator bar of a particular agitator spindle assembly maintains the same angle with respect to the horizontal shaft. The lowermost agitator spindle assembly, however, incorporates a substantially perpendicular arrangement with respect to the placement of the agitator bars and their attachment to the horizontal shaft. In this fashion, when viewed from the lowermost agitator spindle assembly to the uppermost agitator spindle assembly as will be shown in the drawings attached hereto, the agitator bars on the first lowermost assembly are substantially perpendicular to the horizontal shaft, the agitator bars of the agitator spindle assembly above and next to the lowermost assembly have the preferred angle either left or fight of the perpendicular line and so to do the remaining agitator spindle assemblies positioned above the lowermost assembly having the perpendicular agitator bars.

In this fashion, the orientation of the differently configured agitator spindle assemblies provide efficient removal of the peat moss from the bale by an impact action thus causing the peat moss to become disassociated from the bale and fluffed without shredding or any substantial reduction in particle or strand size.

The present invention also includes a hydraulic lift assembly such that an entire bale of peat moss may be placed on the lift and the lift raise the bale into communication with the plurality of agitator spindle assemblies. In this fashion, large bales commonly having sizes up to and including the largest known bales having dimensions of four foot by eight foot square, can be placed on the hydraulic lift and platform. A hydraulic cylinder having spaced apart ends has a first end mounted to the base of the housing and a second end mounted to the underside surface of the lifting platform. The end of the hydraulic cylinder mounted to the lifting platform is preferably attached to a frontal portion of the lifting platform. The rear of the lifting platform is also pivotally attached to vertical supports of the housing. In this fashion, when the hydraulic cylinder is energized, it applies a force to the underside surface of the platform at its frontal portion, thus imparting a vertical force component raising the front portion of the platform and therefore introducing the bale by virtue of its own weight and slight compression from the platform into engagement with the rotating agitator spindle assemblies. In this fashion, continued force applied to the platform by the hydraulic cylinder assembly would tend to continuously raise the bale in communication with the rotating agitators until the entire bale is broken down and fluffed.

The removed peat moss and fluffed material then is ejected from the housing by the action of the lowermost spindle assembly. That is, as the material tends to accumulate in the bottom of the housing around the lowermost spindle assembly, an ejection port is formed into the housing and preferably extends from one side of the housing. Accordingly, the lowermost agitator spindle assembly preferably has a horizontal shaft longer than the horizontal shaft associated with the agitator spindle assemblies having angled agitator bars. The longer shaft enables the agitator spindle bars to continuously push and eject the disassociated peat moss from the housing through the exit port. Accordingly, the horizontal shaft of the lowermost agitator spindle assembly also has agitator bars adjacent to the opening of the exit port. In this fashion, the apparatus inherently prevents clogging of the exit port by virtue of the agitator bars adjacent to the exit port opening.

Accordingly the invention can be summarized in a variety of ways, one which is the following: an apparatus for disassociating organic material from a compressed bale, the apparatus comprising: a cabinet housing having a front and a back, an inside, a top, and a bottom; a plurality of agitator assemblies rotatably mounted to the housing in a vertically parallel alignment within the interior of the cabinet and having a central shaft portion with first end spaced apart from a second end and a plurality of agitators bars extending from the central shaft in a helical pattern from the first end to the second end; a lifting platform pivotally mounted within the interior of the cabinet in to raise a compressed bale of organic material into engagement with the plurality of agitators during operation; hydraulic drive means for rotating the plurality of agitators; an ejection port for expelling the disassociated organic material from the cabinet; and motor means for powering the hydraulic drive means.

A separate and independent hydraulic motor is preferably attached to each of the plurality of agitators. The lifting platform may further include a front and a back, and the back is pivotally attached to the housing, and at least one hydraulic cylinder to raise the front of the platform.

The plurality of agitator assemblies preferably includes a lowermost agitator wherein the second end of central shaft extends into the ejection port to enable organic material disassociated from the compressed bale to be moved to the exit port by the rotation of the lowermost agitator.

At least some of the plurality agitator bars form an acute angle with the central shaft to which they are attached. An agitator extension may also be included. The extension is provided for attachment to the top of the cabinet such that the agitator of the agitator extension is in vertical alignment with the plurality of agitator assemblies within the cabinet housing.

Yet another way of summarizing the present invention is: an apparatus for disassociating organic material from a compressed bale, the apparatus comprising: a cabinet housing having a front and a back, an inside, a top, and a bottom; a plurality of agitator means for disassociating the organic material from a compressed bale thereof, each of the plurality of agitator means is rotatably mounted to the housing in a vertically parallel alignment with adjacent agitator means within the interior of the cabinet and each agitator means has a central shaft portion with first end spaced apart from a second end and a plurality of agitators bars extending from the central shaft in a helical pattern from the first end to the second end; lifting means for rasing a compressed bale of organic material into engagement with the agitator means, the lifting means is pivotally mounted within the bottom interior of the cabinet; a plurality of hydraulic motors to enable the plurality of agitator means to rotate; an ejection port for expelling the disassociated organic material from the cabinet; and motor means for powering the hydraulic motors.

The method of the present invention can be summarized in a variety of ways, one of which is the following: a method of disassociating organic material from a compressed bale, comprising the steps of: providing a cabinet housing having a front and a back, an inside, a top, and a bottom; providing a plurality of agitator assemblies rotatably mounted to the housing in a vertically parallel alignment within the interior of the cabinet and having a central shaft portion with first end spaced apart from a second end and a plurality of agitators bars extending from the central shaft in a helical pattern from the first end to the second end; providing a lifting platform pivotally mounted within the interior of the cabinet provided in to raise a compressed bale of organic material into engagement with the plurality of agitators during operation; providing a hydraulic motor in operative attachment to each of the plurality of agitator assemblies to enable the plurality of agitator assemblies to rotate; providing a drive motor to power the hydraulic motors; placing a compressed bale of organic material on the lifting platform such that the bale contacts at least one of the plurality of agitator assemblies; powering the drive motor; rotating the plurality of agitators; raising the lifting platform; and disassociating the organic material from the compressed bale. The preferred method also includes expelling the disassociated organic material from the cabinet.

It is an object of the present invention to provide an apparatus for disassociating organic material from a compressed bale without a substantial reduction in particle or strand size of the material comprising the compressed bale.

It is another object of the present invention to provide an apparatus for disassociating peat moss from a compressed bale of the same by automatically raising the bale into communication with a plurality of agitators.

It is an advantage of the present invention to provide a plurality of substantially vertically aligned agitator assemblies to enable the device to have a relatively compact size, yet operate efficiently at disassociating the material from the bale.

It is an object of the present invention to provide an apparatus having a plurality of agitator assemblies in a vertically stacked arrangement in order that they may contact a bale of compressed organic material or peat moss at various locations such that the disassociation of the individual particles or strands of material can be more efficiently and uniformly removed from the compressed bale.

It is an advantage of the present invention to provide a plurality of agitator assemblies having agitator bars at various angles with respect to a substantially horizontal shaft to which they are mounted in order that the agitator assemblies may work in unison to efficiently remove the material from the bale.

It is a feature of the present invention to provide an anti-clogging exit port including at least a portion of the lowermost agitator spindle assembly such that agitator bars are adjacent to the exit port opening to insure that the material removed from a particular bale does not clog the apparatus.

It is an object of the present invention to provide an apparatus for disassociating organic material such as a peat moss from a compressed bale by virtue of a plurality of agitator spindle assemblies, each of which are independently driven by their own hydraulic power source.

It is an object of the present invention to provide an apparatus for disassociating organic material such as peat moss from a compressed bale of the same by virtue of raising the bale with a hydraulically driven lifting platform such that the bale through the effects of gravity and a compressional force supplied by the lifting platform comes into communication with the agitator spindle assemblies to enhance the efficient and complete disassociation of the bale.

It is an advantage of the present invention to include all of the operable components of the apparatus for disassociating material such as peat moss from a bale of the same in a single self-contained housing such that removal and exchange of the various components is easily accomplished.

It is a further object of the present invention to provide an extension having an agitator spindle assembly capable of attaching to the uppermost portion of the housing thereby enabling the apparatus to accommodate larger bales of organic material such as peat moss.

It is an advantage and feature of the present invention to provide at least one hold down spike capable of piercing a bale of organic material such as peat moss to hold the bale in communication with the lifting platform and agitator spindle assemblies during operation.

These and other objects, advantages and features of the present invention shall become apparent after consideration of the specifications, drawings, and claims appended hereto. All such objects, advantages and features are contemplated as part of the present invention, even though not specifically set forth herein.

DETAILED DESCRIPTION OF THE PREFERRED EMBODIMENT(S)

Figure 1A:
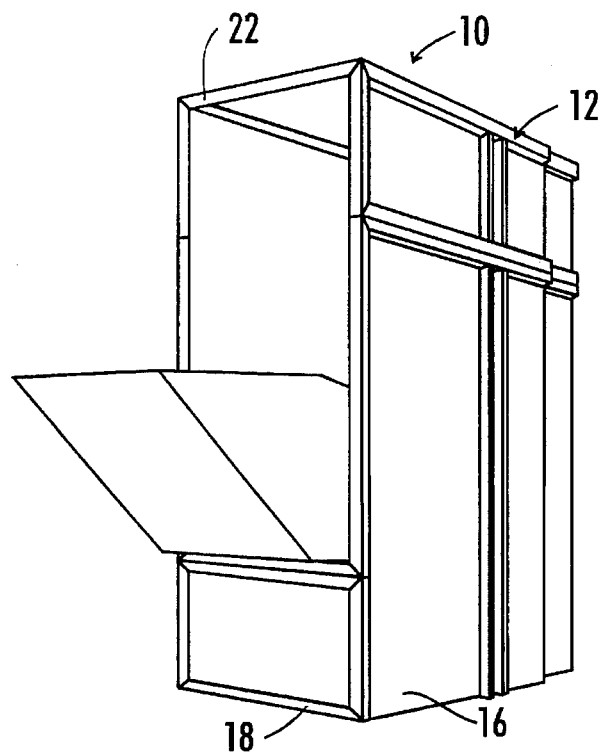
FIGS. 1A, 1B and 1C are elevated perspective views of an embodiment of the present invention.
Figure 1B:
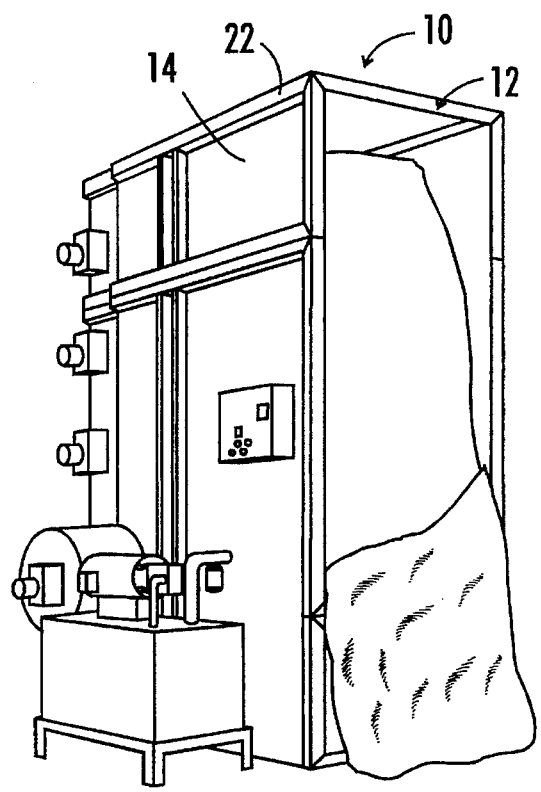
Figure 1C:
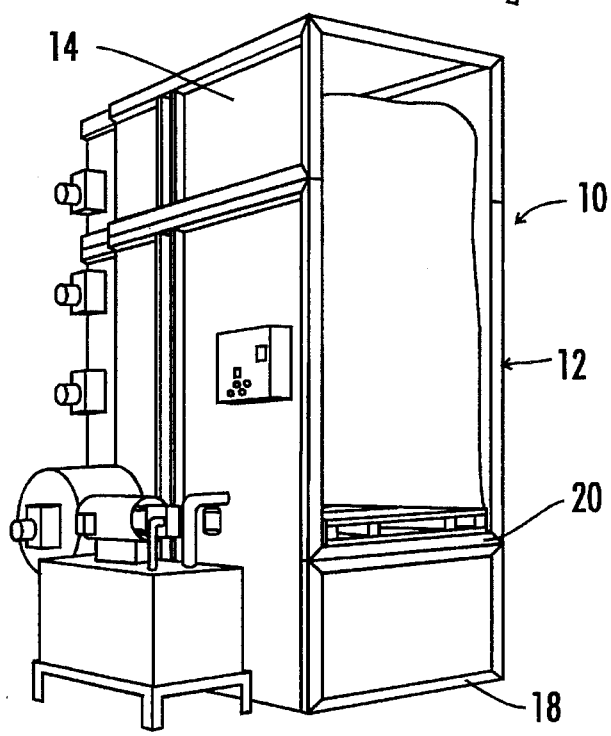

With reference to FIGS. 1A, 1B, 2 and 3, an embodiment of the present invention is designated generally by the reference numeral 10. The embodiment of the invention 10 includes a substantially rectangular housing 12, having a left side 14 and a right side 16 in communication with a base 18. Adjacent to and substantially parallel with the base 18, is a lifting platform 20 (60 in FIGS. 3, 8 and 9) disposed opposite the top 22 of the housing which is preferably open and capable of receiving an extension as described hereinbelow.

A plurality of agitators 36, 38, and 40 are disposed in perpendicular alignment with the left and right sides, 14 and 16 respectively. Each agitator assembly has a left and a right end, 46 and 48, rotatably mounted to the left and right sides of the housing, 14 and 16 respectively. In addition, each agitator assembly has its own independent hydraulic drive motor 50 attached to either end of the agitator assembly on the left or right side, but shown on the left side 14 of the housing 12. Material ejection port 32 (FIG. 2) extends from a side (shown from the right side) of the housing 12. The ejection port includes an opening (not shown) positioned on the bottom of the ejection port housing 34.

Figure 3:
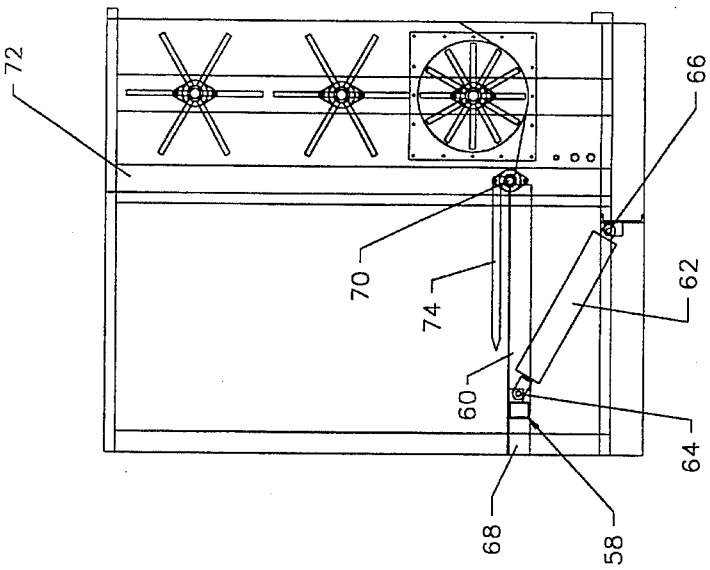
FIG. 3 is a side partially cross-sectional view of the embodiment of the invention shown in FIG. 2.
Figure 2:
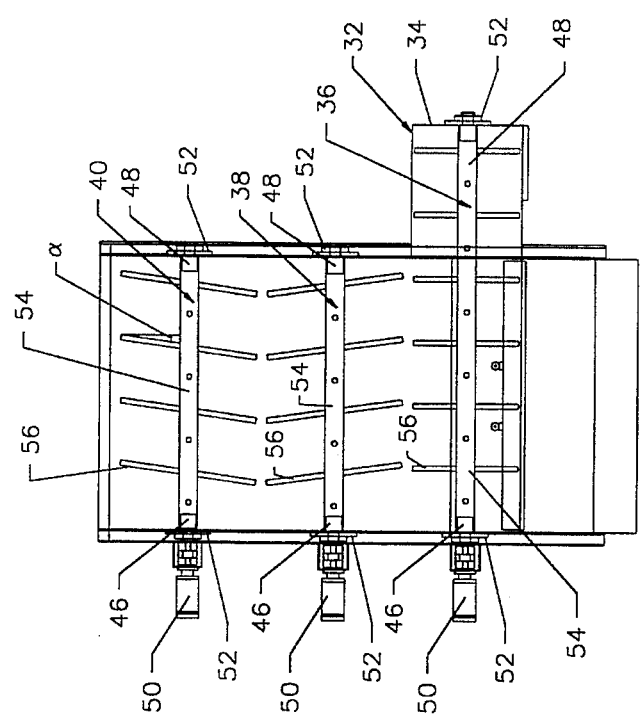
FIG. 2 is a front partially cross-sectional view of the embodiment of the invention shown in FIG. 1.

With reference to FIGS. 2 and 3, the preferred embodiment of the invention includes a lowermost agitator spindle assembly (simply "lowermost agitator") 36 and a plurality of additional agitators shown in FIGS. 2 and 3 as a central agitator 38 and an upper agitator 40.

Figure 5:
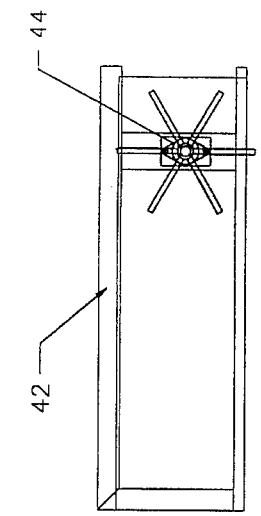
FIG. 5 is a side view of the extension shown in FIG. 4.
Figure 4:
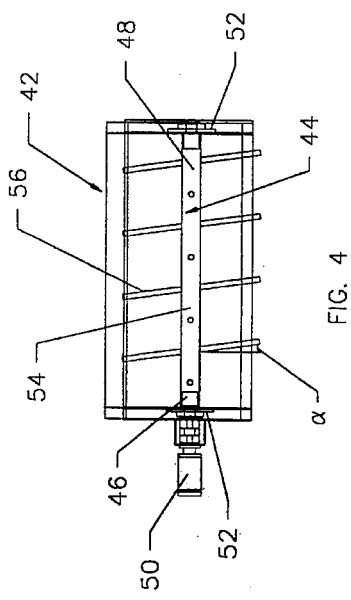
FIG. 4 is a front partially cross-sectional view of an extension attachable to the top of the housing of the embodiment of the invention shown in FIGS. 1 through 3.

With reference to FIGS. 4 and 5, an agitator extension is designated generally with the reference numeral 42 and also includes an agitator assembly 44. Each of the agitator assemblies have a left end 46 and a right end 48. One of the ends of the agitator assembly (either left or right) have a hydraulic motor 50 attached thereto. Of course, it is contemplated that the hydraulic motor 50 can be positioned on the right side 16 of the housing, but in the figures they are shown in the preferred orientation on the left side 14 of the housing 12. Again, with reference to the figures, the free or right ends 48 of the agitators 36, 38, 40 and 44 are attached to the housing with a rotatable bearing assembly 52 to enable the agitator spindle assembly to freely rotate in response to the hydraulic drive motor 50. The configuration of any of the agitators shall be shown and described below, but generally includes a substantially horizontal shaft 54 and a plurality of agitator bars 56. In the preferred embodiment, the agitators 38, 40 and 44 have agitator bars 56 that form an angle alpha with respect to the shaft 54 to which they are rigidly attached.

With reference to FIG. 3, the preferred embodiment of the present invention includes a lifting platform assembly 58 which further includes a lifting platform 60 and a hydraulic cylinder 62. The hydraulic cylinder 62 has spaced apart ends 64 and 66. End 64 is pivotally mounted to the underside surface (not shown) of the lifting platform 60. In addition, the lifting platform 60 has a front 68 and a rear 70. The front of the platform 68 is free to move and sweep out an arc during its operation as will be described hereinbelow.

Accordingly, the rear 70 of the platform 60 is pivotally mounted to a pair of spaced apart supports 72 associated with the left and right sides 14 and 16 of the housing 12. Similarly, end 66 of the hydraulic cylinder 62 is preferably pivotally mounted to the base 18 of the housing 12. In this fashion, when the hydraulic cylinder is energized as described hereinbelow, the lifting platform may pivot and cause the bale of material resting thereon to be raised into communication with the agitators 36, 38, 40 and 44. Hold down spikes 74 are provided with the preferred embodiment, but are optional, and are designed to pierce the bale of material and hold it into position with respect to the platform 60 or they may be inserted between the slats of a pallet on which the bale of material rests (described below).

Figure 7:
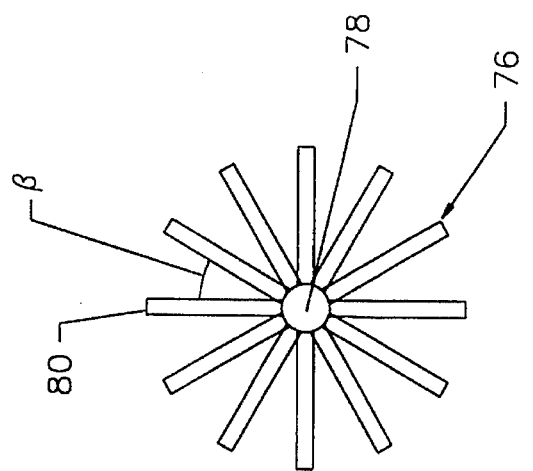
FIG. 7 is an end view of the agitator assembly shown in FIG. 6.
Figure 6:
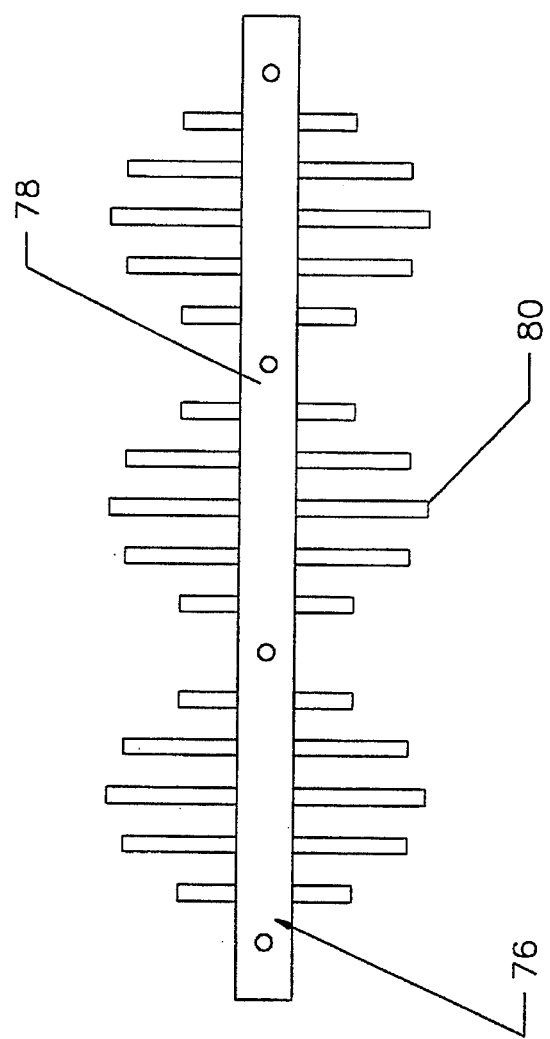
FIG. 6 is a side plan view of an agitator assembly of an embodiment of the present invention.

With reference to FIGS. 6 and 7, an agitator spindle 76 is shown generally as an example. The spindle includes a substantially horizontal shaft 78 and a plurality of agitator bars 80. As shown in FIG. 6 which is a flat plan view, agitator bars are preferably not of varying heights but are spaced from one another at various degrees in circular coordinates. That is, as best seen in FIG. 7, each agitator bar 80 forms an angle beta with each adjacent agitator bar 80. Accordingly, the end view of the agitator spindle shown in FIG. 7 has a substantially uniform projectional diameter. As seen in FIG. 6, the orientation of the plurality of agitator bars 80 forms a helix along the longitudinal axis L of the shaft 78.

MODE OF OPERATION

Figure 10:
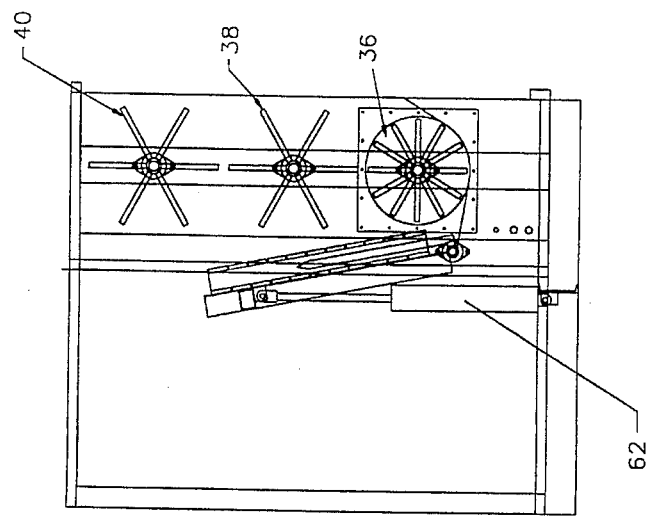
FIG. 10 is a side cross-sectional view of the present invention similar to that shown in FIG. 9 with the lifting platform in a fully extended, substantially vertical position and the bale of peat moss completely disassociated.
Figure 9:
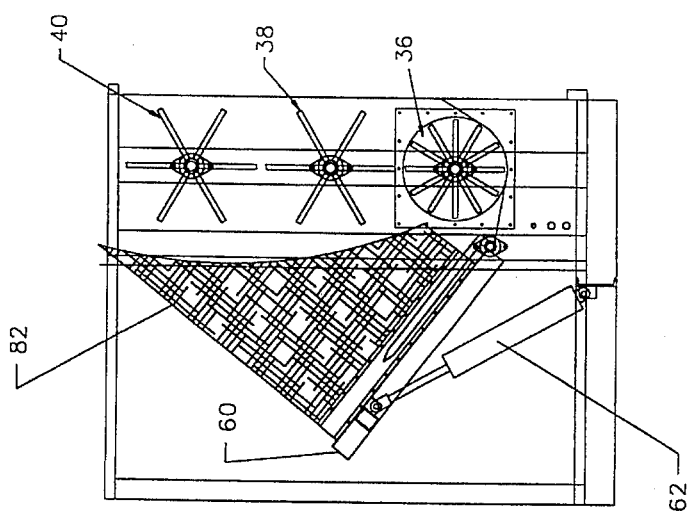
FIG. 9 is a side partially cross-sectional view of the apparatus shown in FIGS. 1A and 1B, 2, 3 and 8 with the lifting platform in a raised position and a bale of peat moss resting thereon as depicted in FIG. 8 shown in operable communication with the agitator assemblies of the invention.
Figure 8:
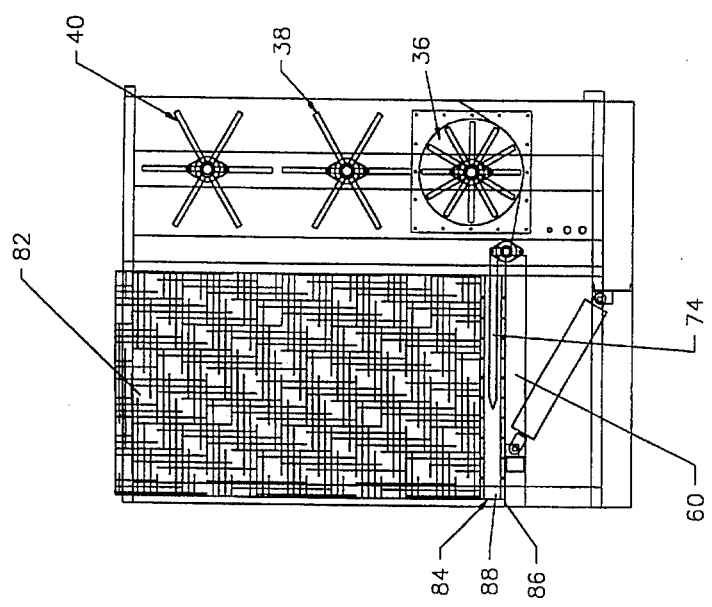
FIG. 8 is a side view similar to that shown in FIG. 3, but with a bale of peat moss positioned on a pallet resting on the lifting platform of the present invention.

With reference to FIGS. 8 through 10, the preferred embodiment of the invention is illustrated in operation. With reference to FIG. 8, a bale of peat moss 82 is shown resting on a pallet 84 which in turn rests on the uppermost surface 86 of the lifting platform 60. Hold down spike 74 is shown inserted between the spaced apart slats 88 of the pallet 84.

The hydraulic motors (see FIGS. 2 and 4) are then energized to begin the rotation of the agitator 36, 38, 40 and optionally 44 (FIGS. 4 and 5). It is important to point out that the lowermost agitator 36 as shown in FIGS. 8 through 10 includes a greater number of agitator bars 56 than do the central and upper agitators 38 and 40. This is preferred because the lowermost agitator 36 is also in communication with the ejection housing 32 and is provided to move the material from the lowermost confines of the housing out to the ejection housing 32 and through the port 34. A greater number of agitator bars enables this to be accomplished more efficiently, but the agitators may have any desired number of agitator bars depending upon the embodiment of the invention.

With reference to FIG. 9, lifting platform 60 is shown in a partially elevated position by the hydraulic cylinder 62. In addition, the bale of peat moss 82 is shown partially removed and in communication with the agitator bars of the various agitator assemblies.

With reference to FIG. 10, the bale of peat moss 82 of FIGS. 8 and 9 has been fully disassociated and fluffed by the agitators 36, 38 and 40 shown in FIGS. 2 through 5 leaving behind a fully extended hydraulic cylinder 62 and empty pallet 84.

These and other embodiments of the present invention shall become apparent after consideration of the specifications, drawings and claims appended hereto. All such embodiments and equivalents are contemplated as part of the present invention whose only limitation is the scope of the appended claims.

What is claimed is:

1. An apparatus for disassociating organic material from a compressed bale, the apparatus comprising:

a cabinet housing having a front and a back, an inside, a top, and a bottom; a plurality of agitators rotatably mounted to the housing in a vertically parallel alignment within the interior of the cabinet and having a central shaft portion with a first end spaced apart from a second end and a plurality of agitator bars extending from the central shaft in a helical pattern from the first end to the second end;

a lifting platform pivotally mounted within the interior of the cabinet and configured to operably raise a compressed bale of organic material into engagement with the plurality of agitators during use;

hydraulic drive means for rotating the plurality of agitators;

an ejection port for expelling the disassociated organic material from the cabinet; and motor means for powering the hydraulic drive means.

2. The apparatus of claim 1, wherein the hydraulic drive means further includes:

an independent hydraulic motor attached to each of the plurality of agitators.

3. The apparatus of claim 1, wherein the lifting platform further includes:

a front and a back, and the back is pivotally attached to the housing.

4. The apparatus of claim 3, wherein the lifting platform further includes:

at least one hydraulic cylinder to raise the front of the platform.

5. The apparatus of claim 1, wherein the plurality of agitators includes:

a lowermost agitator wherein the second end of the central shaft portion extends into the ejection port to enable organic material disassociated from the compressed bale to be moved to the exit port by the rotation of the lowermost agitator.

6. The apparatus of claim 1, wherein:

at least one of the plurality agitator bars forms an acute angle with the central shaft to which it is attached.

7. The apparatus of claim 1, further including:

an agitator extension including an agitator assembly for attachment to the top of the cabinet such that the agitator assembly of the agitator extension is in vertical alignment with the plurality of agitators within the cabinet housing.

8. An apparatus for disassociating organic material from a compressed bale, the apparatus comprising:

a cabinet housing having a from and a back, an inside, a top, and a bottom;

a plurality of agitator means for disassociating the organic material from a compressed bale thereof, each of the plurality of agitator means is rotatably mounted to the housing in a vertically parallel alignment with adjacent agitator means within the interior of the cabinet and each agitator means has a central shaft portion with a first end spaced apart from a second end and a plurality of agitator bars extending from the central shaft in a helical pattern from the first end to the second end;

lifting means for rasing a compressed bale of organic material into engagement with the agitator means, the lifting means is pivotally mounted within the bottom interior of the cabinet;

a plurality of hydraulic motors to enable the plurality of agitator means to rotate;

an ejection port for expelling the disassociated organic material from the cabinet; and motor means for powering the hydraulic motors.

9. The apparatus of claim 8, wherein the plurality of hydraulic motors further include:

a hydraulic motor attached to each of the plurality of agitators.

10. The apparatus of claim 8, wherein the lifting means further includes:

a front and a back, and the back is pivotally attached to the housing.

11. The apparatus of claim 10, wherein the lifting means further includes:

at least one hydraulic cylinder to raise the front of the platform.

12. The apparatus of claim 8, wherein the plurality of agitator means includes:

a lowermost agitator means wherein the second end of the central shaft portion thereof extends into the ejection port to enable organic material disassociated from the compressed bale to be moved to the exit port by the rotation of the lowermost agitator.

13. The apparatus of claim 8, wherein:

at least one of the plurality agitator bars forms an acute angle with the central shaft to which it is attached.

14. The apparatus of claim 8, further including:

an agitator extension including an agitator assembly for attachment to the top of the cabinet such that the agitator assembly of the agitator extension is in vertical alignment with the plurality of agitator means within the cabinet housing.

* * * * *